(12) United States Patent
Lucero et al.

(10) Patent No.: US 7,864,541 B2
(45) Date of Patent: *Jan. 4, 2011

(54) AIRFLOW CONTROL SYSTEM

(75) Inventors: Christopher D. Lucero, Chandler, AZ (US); Javier Leija, Chandler, AZ (US); James C. Shipley, Gilbert, AZ (US); Christopher A. Gonzales, Chandler, AZ (US)

(73) Assignee: Radisys Corporation, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/686,255

(22) Filed: Jan. 12, 2010

(65) Prior Publication Data

US 2010/0118490 A1 May 13, 2010

Related U.S. Application Data

(63) Continuation of application No. 11/005,910, filed on Dec. 6, 2004, now Pat. No. 7,652,891.

(51) Int. Cl.
*H05K 5/00* (2006.01)
(52) U.S. Cl. .................. 361/752; 361/800; 361/687
(58) Field of Classification Search ............... 361/752, 361/790, 797, 800, 756, 730, 686–688, 700–703
See application file for complete search history.

(56) References Cited

U.S. PATENT DOCUMENTS

| | | | |
|---|---|---|---|
| 4,894,749 A | 1/1990 | Elko et al. |
| 5,210,680 A | 5/1993 | Scheibler |
| 5,613,906 A | 3/1997 | Kikinis |
| 5,914,858 A | 6/1999 | McKeen et al. |
| 5,995,368 A | 11/1999 | Lee et al. |
| 6,005,770 A | 12/1999 | Schmitt |
| 6,031,717 A | 2/2000 | Baddour et al. |
| 6,047,836 A | 4/2000 | Miles |
| 6,151,213 A | 11/2000 | Ater et al. |
| 6,285,548 B1 | 9/2001 | Hamlet et al. |
| 6,407,331 B1 | 6/2002 | Smith et al. |
| 6,710,240 B1 | 3/2004 | Chen et al. |
| 6,738,262 B2 | 5/2004 | Trioli et al. |
| 6,912,131 B2 | 6/2005 | Kabat |
| 6,922,337 B2 | 7/2005 | Malone et al. |
| 6,980,435 B2 | 12/2005 | Shum et al. |
| 7,259,961 B2 | 8/2007 | Lucero et al. |

(Continued)

FOREIGN PATENT DOCUMENTS

WO 2006062730 A2 6/2006

OTHER PUBLICATIONS

International Search Report and Written Opinion of the International Searching Authority dated May 17, 2006, application PCT/US2005/042254, filed Nov. 17, 2005.

(Continued)

*Primary Examiner*—Hung S Bui
(74) *Attorney, Agent, or Firm*—Stoel Rives LLP (57) ABSTRACT

A method according to one embodiment may include providing a baffle assembly comprising at least one airflow control zone with an airflow resistance. The method of this embodiment may also include positioning said baffle assembly in a flow of air through a chassis. Of course, many alternatives, variations, and modifications are possible without departing from this embodiment.

14 Claims, 5 Drawing Sheets

U.S. PATENT DOCUMENTS

| | | | |
|---|---|---|---|
| 7,355,850 B2 | 4/2008 | Baldwin, Jr. | |
| 7,394,654 B2 | 7/2008 | Zieman et al. | |
| 7,420,806 B1 | 9/2008 | Lima et al. | |
| 7,652,891 B2 * | 1/2010 | Lucero et al. | 361/752 |
| 2003/0141089 A1 | 7/2003 | Gravell et al. | |
| 2004/0057210 A1 | 3/2004 | Wilson et al. | |
| 2004/0218359 A1 | 11/2004 | Malone et al. | |

OTHER PUBLICATIONS

Notice of Allowance mailed Sep. 11, 2009, for U.S. Appl. No. 11/005,910, filed Dec. 6, 2004.

Office Action mailed Apr. 1, 2009, for U.S. Appl. No. 11/005,910, filed Dec. 6, 2004.

Office Action mailed Nov. 6, 2008, for U.S. Appl. No. 11/005,910, filed Dec. 6, 2004.

Office Action mailed Feb. 21, 2008, for U.S. Appl. No. 11/005,910, filed Dec. 6, 2004.

Office Action mailed Aug. 3, 2007, for U.S. Appl. No. 11/005,910, filed Dec. 6, 2004.

Office Action mailed Feb. 13, 2007, for U.S. Appl. No. 11/005,910, filed Dec. 6, 2004.

* cited by examiner

AIRFLOW CONTROL SYSTEM

RELATED APPLICATION

This application is a continuation of U.S. application Ser. No. 11/005,910, titled "AIRFLOW CONTROL SYSTEM," filed Dec. 6, 2004, which is hereby incorporated by reference herein in its entirety.

FIELD

The present disclosure relates to airflow control systems, apparatus, and methods for computer and electronics equipment.

BACKGROUND

Increases in processor speeds and circuit board densities have resulted in an increase in the heat generated by computer systems and other electronics systems. In a conventional computer or electronics system, heat generated by various components of the system is often removed through convective cooling of the various components, or of commonly housed components. Convective cooling of the computer or electronics system may take advantage of natural convection currents created by the heat produced by various heat generating components to circulate air within a housing or chassis of the computer or electronics system. Natural convective cooling, however, tends to be relatively inefficient, and may even be inadequate, especially for systems that generate a great deal of heat and/or are prone to damage from over heating.

More typically, computer or electronics systems are cooled using forced convection. In a forced convection cooling system a fan may be used to circulate air within a housing or chassis of the computer or electronics system. In many systems, the fan may be used to force the intake of air from the exterior of the computer or electronics system, pass the air through the housing or chassis, and exhaust heated air from housing or chassis. While such forced convection cooling systems may provide more efficient cooling than a natural convection cooling system, the airflow within the housing or chassis of the computer or electronics system is generally not uniform. The location of the intake and exhaust, as well as the shape of the housing or chassis and the configuration of any components within the housing or chassis may create regions of high airflow and regions of low airflow within the housing or chassis. Any component located within, or adjacent to, a region of low air flow may receive insufficient cooling. Therefore, circuit boards for such computer and electronics systems are often designed to position heat generating components in, or adjacent to, regions of relatively high airflow through the housing or chassis. Positioning heat generating components in, or adjacent to, regions of relatively high airflow often requires a compromise in circuit board layout.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variation thereof will be apparent to those skilled in the art. Accordingly, it is intended that the claimed subject matter be viewed broadly.

DETAILED DESCRIPTION

Figure 1:
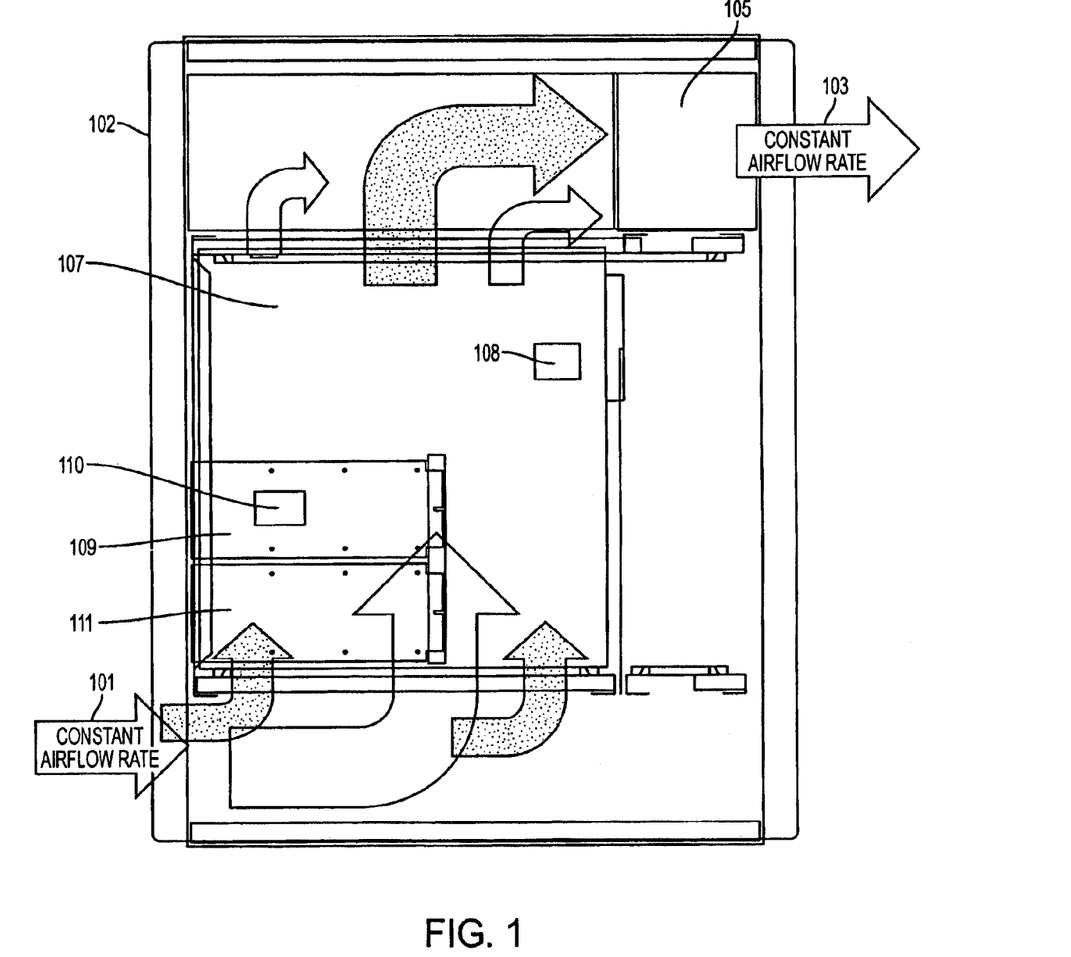
FIG. 1 schematically depicts an airflow through a chassis.

With reference to FIG. 1, a chassis 102 for a computer or other electronics equipment is schematically illustrated. As shown, the chassis 102 may include one or more circuit boards 107 disposed within the chassis 102. According to one embodiment the chassis 102 may be an advanced telecommunications computing architecture (advanced TCA or ATCA) chassis, complying with, or compatible with, PCI Industrial Computer Manufacturers Group (PICMG), rev. 3.0, Advanced Telecommunications Computing Architecture (ATCA), published Dec. 30, 2002. According to such an embodiment, the circuit board 107 disposed within the chassis may be an ATCA board, also referred to as an ATCA blade. In some embodiments, one or more circuit boards 107 may be configured to be coupled to one or more cards 109, 111. Cards 109, 111 may be either removably and/or permanently coupled to the circuit board 107.

The chassis 102 may include an air cooling system including an air inlet region 101, for example in a lower portion of the chassis 102. The chassis 102 may also have an air exhaust region 103, which may, for example, be located in an upper portion of the chassis. Airflow through the chassis 102 may be induced by one or more fans 105 which may be positioned adjacent to the air exhaust region 103 of the chassis 102. Accordingly, a convective cooling system may be a so-called 'pull-through' cooling system, in which the cooling air is drawn through the chassis 102 by the fan 105. Alternatively, the cooling system may be a so-called 'push-through' cooling system in which the fan or fans may be positioned adjacent the air inlet region 101. According to such a configuration, the fan or fans may draw air from the inlet region 101 and force the air into the chassis 102, thereby at least partially pressurizing the chassis 102 and causing air to flow to, and out of, the air exhaust region 103.

In either a pull-through or a push-through cooling arrangement, the airflow through the chassis 102 may have a distribution that may be largely determined by size and/or geometry of the chassis 102 and any boards and/or cards, etc. disposed within the chassis 102. As used in any embodiment herein, airflow distribution refers to the flow of air from the air inlet region 101, through the chassis 102, and to the air exhaust region 103. Particularly, the airflow along any particular path between the air inlet 101 and the air exhaust 103 may vary relative to any other particular path between the air inlet 101 and the air exhaust 103. In the schematic illustration of FIG. 1, the airflow distribution of the chassis 102 may include a relatively high airflow along a path generally through the center of the chassis 102, as indicated by the larger arrow. The airflow to either side of this central region may be less than the airflow along the path generally through the center of the chassis, as indicated by the relatively smaller arrows. It should be understood, however, that a chassis may have an airflow distribution different than the schematically illustrated airflow distribution. While the local airflow may vary for different paths through the chassis 102, the overall airflow through the chassis 102 may generally be a function of the chassis layout and/or form factor, boards and/or cards disposed within the chassis, etc.

The cooling effect experienced by components disposed within the chassis 102, for example, components disposed on and/or coupled to circuit board 107 and/or cards 109, 111, may be a function of the airflow distribution. That is, a component disposed in, or adjacent to, a relatively high airflow path, e.g. generally in the center of the chassis 102, may experience a greater cooling effect as compared to components disposed in, or adjacent to relatively low airflow paths, e.g. to either side of the chassis 102, in the illustrated schematic view. Accordingly, the cooling effect experienced by components within the chassis 102 may be, at least in part, dependent upon the location of such components within the chassis 102.

Figure 2:
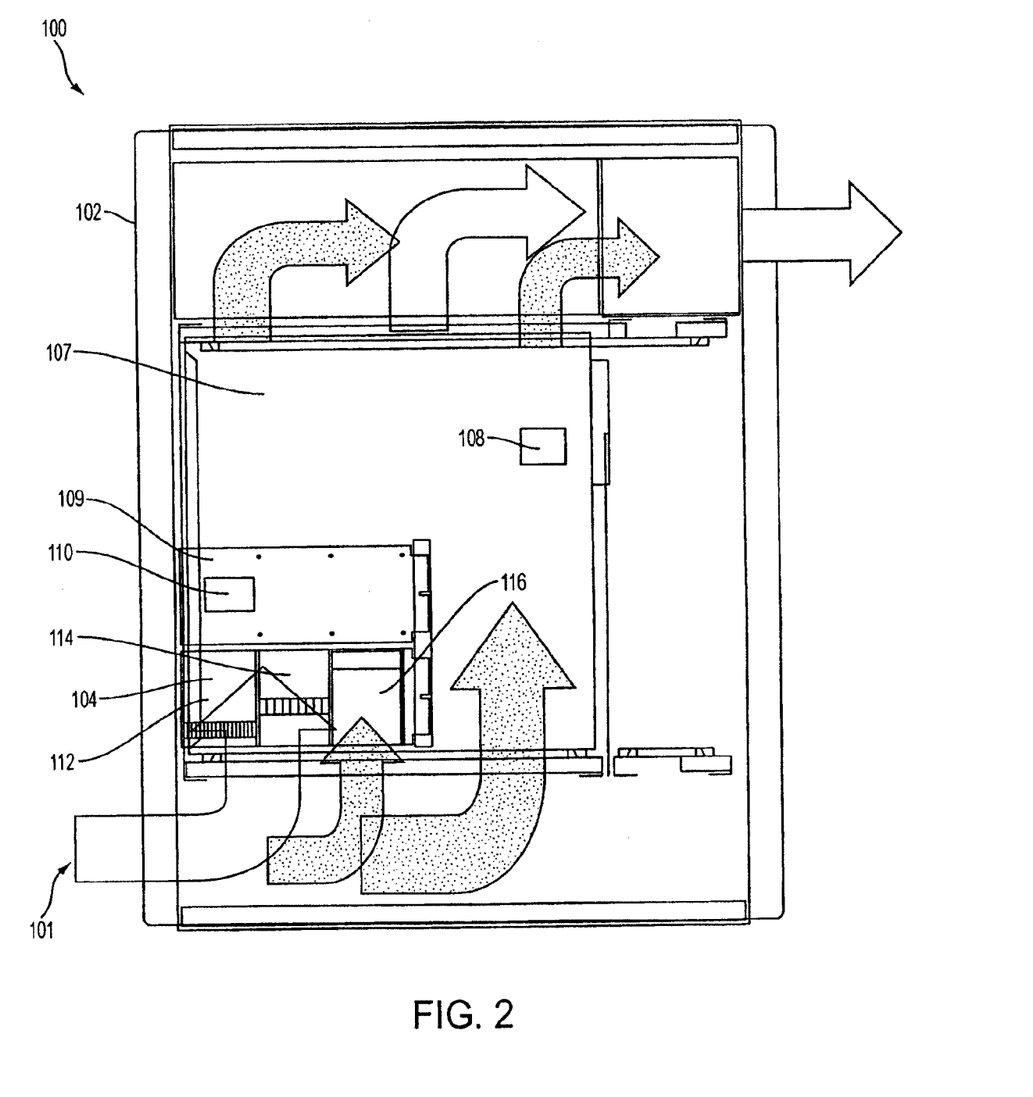
FIG. 2 schematically illustrates airflow through a chassis including an airflow control assembly consistent with the present disclosure.

Turning to FIG. 2, an embodiment of an airflow control system 100 consistent with the claimed subject matter is schematically illustrated. The airflow control system 100 may be applied to computer or telecommunications equipment to selectively vary the airflow distribution through the chassis 102 of the equipment. The airflow distribution through the chassis 102 may be selectively varied to provide increased and/or decreased airflow across various components and/or regions within the chassis 102. For example, the airflow across various portions of circuit board 107 and/or cards 109 and/or 111 disposed within the chassis 102 may be controlled and/or varied. While the airflow control system 100 herein may selectively vary the airflow distribution through the chassis 102, the overall airflow rate through the chassis 102 may be generally constant.

As discussed with reference to FIG. 1, an airflow control system 100 according to the present disclosure may be employed in the context of an advanced telecommunications computing architecture (ATCA) environment system. Accordingly, the chassis 102 may be an ATCA chassis, complying with, or being compatible with, ATCA specification. The airflow control system 100 may be used in applications including confined spaces, such as single-board-computer blades like the Advanced TCA form factor.

As illustrated, the airflow control system 100 may include a baffle assembly 104 that may be disposed within the chassis 102. The baffle assembly 104 may be capable of providing an airflow resistance across the region of the baffle assembly 104. The airflow resistance across the region of the baffle assembly 104 may, in turn, affect the airflow resistance profile across the chassis 102 as a whole. As used herein, the airflow resistance provided by the baffle assembly 104 may be considered in terms of relative airflow resistance as compared to other portions of the chassis 102, and/or as compared to the airflow resistance experienced in the general region of the chassis 102 in the absence of the baffle assembly 104. Alternatively, or additionally, the relative airflow resistance provided by the baffle assembly 104 may be considered in terms of absolute airflow.

In the illustrated embodiment, the baffle assembly 104 is disposed adjacent to an air inlet region 101 of the chassis 102. The airflow resistance provided by the baffle assembly 104 may alter the airflow resistance across the chassis 102. The altered airflow resistance across the chassis 102 may, in turn, alter the airflow distribution of air flowing through the chassis 102. Consistent with the illustrated embodiment, at least a portion of the airflow into the chassis 102 may encounter the baffle assembly 104.

By comparison to the airflow distribution for the chassis 102 schematically depicted in FIG. 1, the baffle assembly 104 may alter the airflow distribution through the chassis 102. As schematically depicted in FIG. 2, the baffle assembly may provide an airflow distribution having a relatively small airflow through the center of the chassis 102 and may have an airflow adjacent either side of the chassis that is relatively large compared to the airflow through the center of the chassis 102. This airflow distribution is in comparison to the relatively large airflow in the center of the chassis 102 and the relatively smaller airflows to either side of the chassis 102 illustrated in FIG. 1. Numerous other airflow distributions may be achieved utilizing a baffle assembly 104 providing different relative airflow resistance at different locations in the chassis 102.

In the illustrated embodiment, heat generating components 108, 110 may be disposed within the chassis 102. Such heat generating components 108, 110 may include, for example, processors, chipsets, etc. Heat generating components may be disposed on a printed circuit board disposed within the chassis, such as the illustrated heat generating component 108 disposed on the ATCA circuit board 107. Additionally, heat generating components may be disposed on other features within the chassis 102, such as the illustrated heat generating component 110 disposed on the card 109 coupled to the circuit board 107. Heat generating components may additionally, or alternatively, be disposed on and/or associated with other components or features disposed at least partially within the chassis 102.

As depicted in FIG. 2, the baffle assembly 104 may be configured to customize the airflow distribution through the chassis 102 in a manner to increase airflow in regions including and/or adjacent to heat generating components 108, 110. The increased airflow in the regions including and/or adjacent to the heat generating components 108, 110 may increase the cooling of the heat generating components 108, 110 as compared to a chassis 102 not including a baffle assembly 104. According to one aspect, the ability to customize the airflow distribution through the chassis 102 using a baffle assembly 104 may increase the freedom of design of components to be disposed within the chassis 102. For example, heat generating components 108, 110 may be positioned based on desired PCB layout and/or routing considerations.

While the airflow distribution in the illustrated embodiment of FIG. 2 includes airflows adjacent either side of the chassis 102 being at least slightly larger than the airflow through the center of the chassis 102, this airflow distribution is provided to illustrate that the airflow distribution through the chassis 102 may be customized to provide greater airflow across heat generating components 108, 110. Other airflow distributions may be achieved by providing a baffle assembly 104 which has different airflow resistances and/or different airflow resistances at different regions or zones of the baffle assembly. For example, in addition to, or as an alternative to, increasing the airflow in the region of specific heat generating components 108, 110, an airflow control system 100 consistent with the present disclosure may be configured to generally provide a more balanced and/or even airflow distribution through the chassis 102. As such, the baffle assembly 104 may be configured to provide generally uniform airflow across the chassis 102.

In an airflow control system 100 consistent with the present disclosure, the airflow resistance may be generally uniform across the baffle assembly 104. Alternatively, the airflow resistance may vary for different regions of the baffle assembly 104. According to the latter configuration, the baffle assembly 104 may include a plurality of zones 112, 114, 116.

The first zone 112 may have a first airflow resistance, the second zone 114 may have a second airflow resistance, and the third zone 116 may have a third airflow resistance. The airflow resistance of one or more of the first 112, second 114, and/or third 116 zones may be different from one or more of the other zones 112, 114, 116. Alternatively, the airflow resistance of one or more of the zones 112, 114, 116 may be the same as the airflow resistance through one or more of the other zones 112, 114, 116. Additionally, while the illustrated airflow control system 100 is shown including three zones 112, 114, 116, consistent with the present disclosure the airflow control system 100 may include a greater or a lesser number of zones.

An airflow control system 100 utilizing a baffle assembly 104 having multiple zones 112, 114, 116 may allow the airflow distribution to be customized to a greater extent. For example, the airflow distribution across the chassis 102 may be customized to a greater extent as a result of the airflow resistance provided by each zone 112, 114, 116 of the baffle assembly 104. In addition to customizing the airflow distribution in the chassis 102 generally, the airflow distribution across the baffle assembly 104 may also be customized. As discussed previously, the airflow resistance of each zone 112, 114, 116 may be individually controlled, independently of the other zones 112, 114, 116. This aspect may permit variation in the airflow distribution across the baffle assembly 104 and/or may allow the airflow distribution across the chassis 102 to be customized to a greater extent.

In another embodiment, a baffle assembly may include only a single zone providing an airflow resistance. The single baffle according to such an embodiment may be positioned in a location within the airflow through the chassis. The presence of the baffle at the location within the airflow stream through the chassis may alter the airflow distribution through the chassis. For example, in a chassis having a low airflow resistance in a central region, as compared to other regions of the chassis, the airflow through the chassis may be greatest in the central region, as shown in FIG. 1. A single baffle providing a degree of airflow resistance may be positioned at least partially within the central, or low airflow resistance, region of the chassis. The presence of the baffle extending at least partially in to the central low airflow resistance region of the chassis may increase the airflow resistance through the central region of the chassis based on the airflow resistance of the baffle. The increase in airflow resistance in the central region of the chassis may increase the airflow in the surrounding regions of the chassis. The increased airflow in the surrounding regions of the chassis may increase the cooling of such regions.

Figure 3:
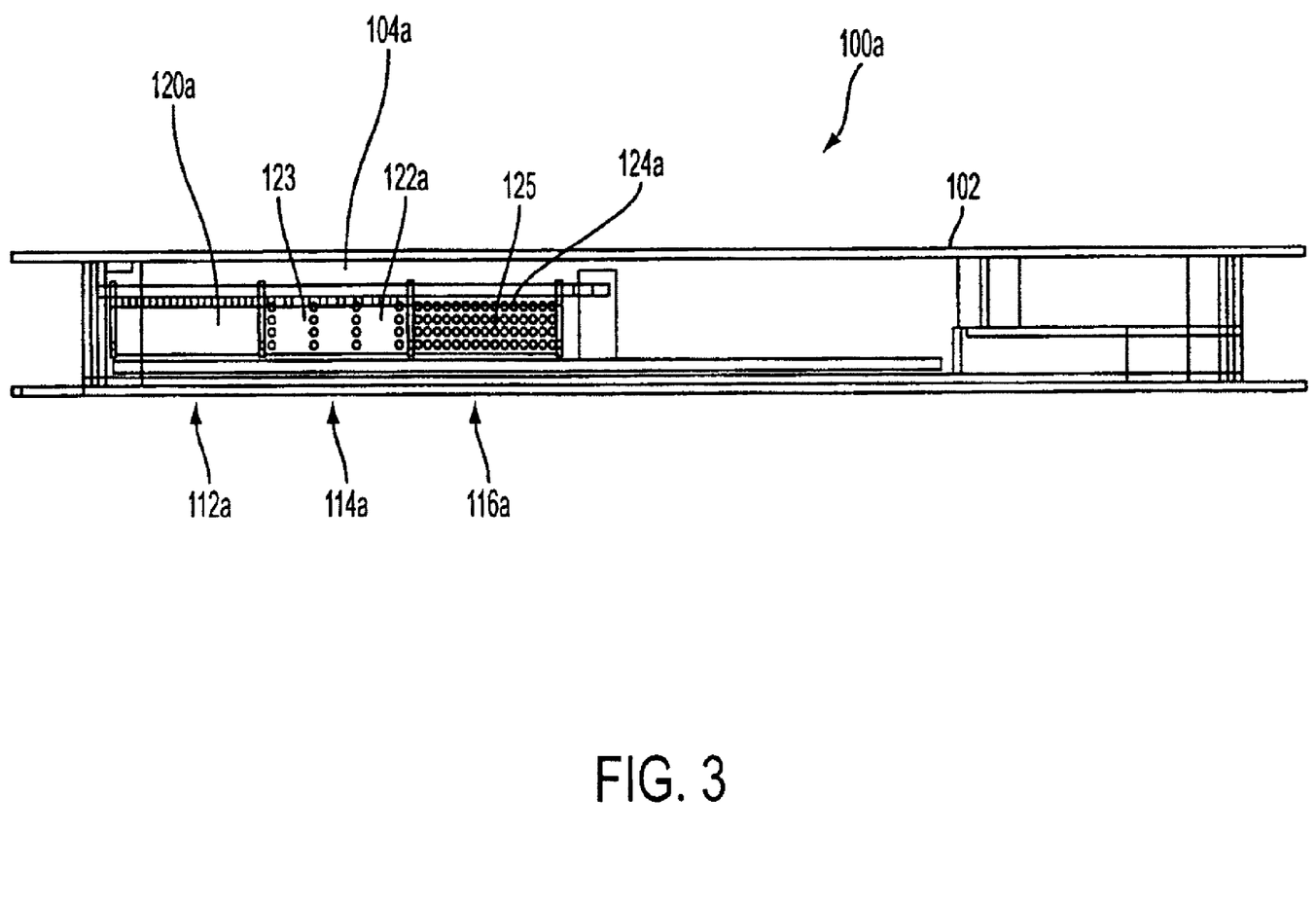
FIG. 3 is a bottom view of a chassis including an airflow control assembly consistent with the present disclosure.

Turning to FIG. 3, a bottom view of an embodiment of an airflow control system 100*a* consistent with the present disclosure is shown. In this view, the baffle assembly 104*a* can be seen having three zones 112*a*, 114*a*, 116*a*. In the illustrated embodiment, each zone 112*a*, 114*a*, 116*a* of the baffle assembly 104*a* is shown having a different flow resistance. The different flow resistances of each zone 112*a*, 114*a*, 116*a* of the illustrated baffle assembly 104*a* may be achieved by providing a different free-area ratio through the various zones 112*a*, 114*a*, 116*a*. As used herein, the free-area ratio is the ratio of the area that is open to permit airflow through the zone relative to the total cross-sectional area of the zone perpendicular to the airflow path through the zone 112*a*, 114*a*, 116*a*.

Each of the zones 112*a*, 114*a*, 116*a* of the baffle assembly 104*a* may include at least one baffle 120*a*, 122*a*, 124*a* respectively. The desired airflow resistance of each of the zones 112*a*, 114*a*, 116*a* may be achieved by providing openings or holes through the baffles 120*a*, 122*a*, 124*a*. The openings or holes through the baffles 120*a*, 122*a*, 124*a* may provide desired free-area ratios to achieved the desired airflow resistance. Different free-area ratios may be achieved by providing more or fewer holes through the baffles 120*a*, 122*a*, 124*a*, as in the illustrated embodiment, and/or by providing larger or smaller holes. In either case, the free-area ratio of each baffle 120*a*, 122*a*, 124*a* may be configured to provide a desired airflow resistance through each respective baffle 120*a*, 122*a*, 124*a*.

Consistent with the foregoing, in the illustrated embodiment, a first zone 112*a* is provided having the greatest airflow resistance. As shown, the relatively high airflow resistance of the first zone 112*a* may be achieved by providing a baffle 120*a* not having any openings or holes extending through the baffle 120*a*. As such, the baffle 120*a* may be considered to have a 0% free-area ratio. By comparison, a second zone 114*a* may have a baffle 122*a* including a first array of holes 123 extending through the baffle providing an intermediate airflow resistance. As shown, the first array of holes 123 may have a collective area that is equal to about 20% of the area of the baffle 122*a*. As such, the baffle may be considered to have a 20% free-area ratio. A third zone 116*a* may have a low airflow resistance as compared to the first and second zones 112*a*, 114*a*. The low airflow resistance of the third zone 116*a* may be achieved by providing a baffle 124*a* having a second array of holes 125. In the illustrated embodiment, the second array of holes 125 may account for approximately 70% of the area of the baffle 124*a*, providing a 70% free-area ratio for the third zone 116*a*.

While the illustrated embodiment depicts a baffle assembly 104*a* having three zones with each zone having a particular free area ratio, the airflow resistance through the baffle assembly 104*a* in general and/or through each zone of the baffle assembly in particular may be customized according to the desires and/or requirements of a particular application and/or chassis configuration. As such, each of the zones of a baffle assembly 104*a* consistent with the present disclosure may be provided having a free-area ratio of 0% to 100%, inclusive. A 0% free-area ratio may be achieved by completely obstructing airflow through the zone and/or by providing a baffle not having any openings extending therethrough. A 100% free-area ratio may by achieved by eliminating airflow obstructions through the zone and/or by providing a zone that does not include a baffle extending into the airflow pathway.

Figure 4:
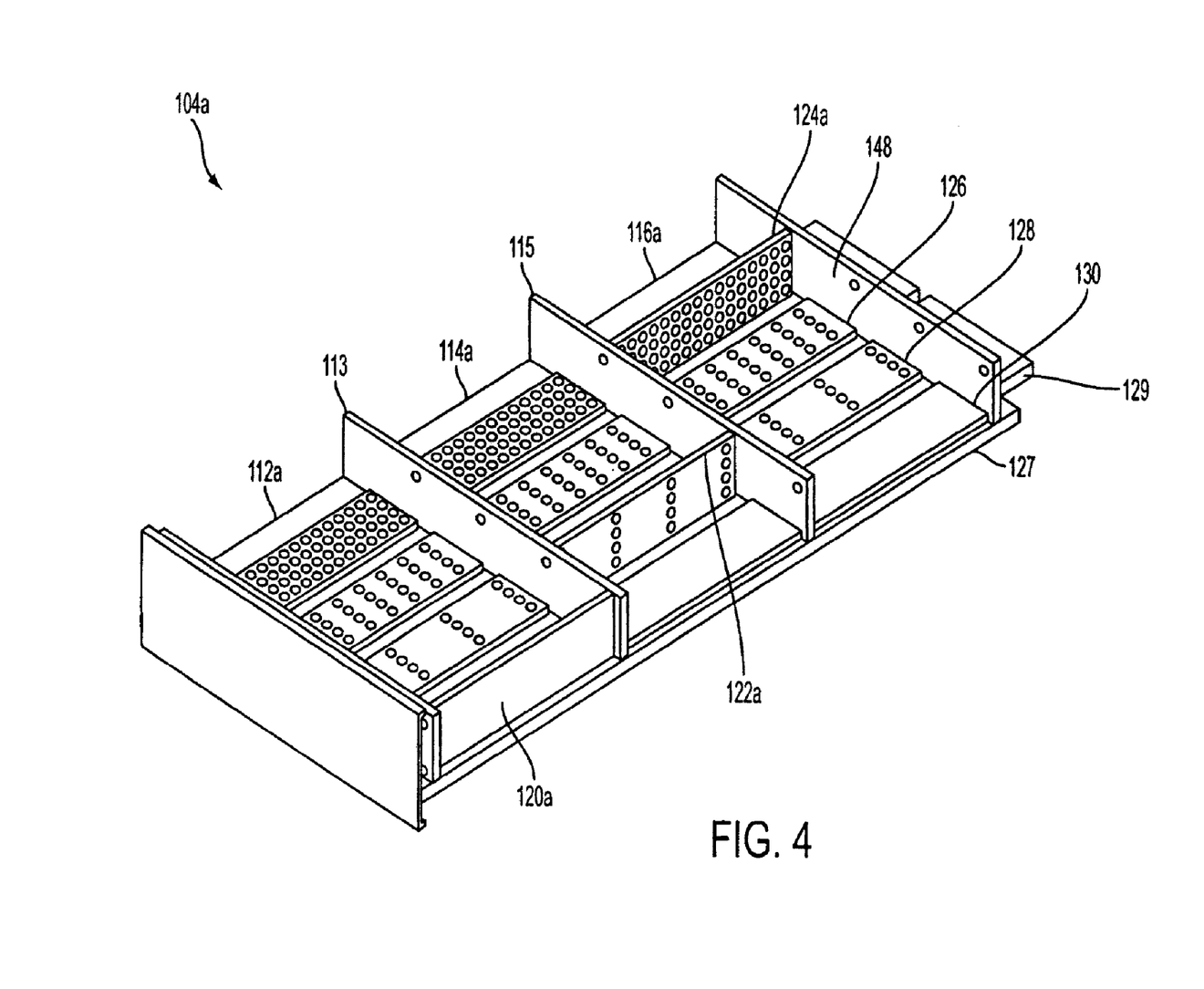
FIG. 4 is a perspective view of an embodiment of an airflow control baffle assembly consistent with the present disclosure.

Referring to FIG. 4, an embodiment of a baffle assembly 104*a* consistent with the present disclosure is illustrated. The illustrated baffle assembly 104*a* may comprise the form factor of a card that can be received in the chassis 102. According to one embodiment, the baffle assembly 104*a* may be configured within the form factor of a card that may be coupled to a circuit board 107 that is disposed within the chassis 102. Alternatively or additionally, baffle assembly may be coupled to other components within the chassis and/or to the chassis, without departing from this embodiment. In one particular embodiment, the baffle assembly 104*a* may comprise the form factor of a mezzanine card. The baffle assembly 104*a* may be coupled to an unpopulated slot on the ATCA board 107 disposed within the chassis 102. As shown, the baffle assembly 104*a* may be a dummy card. A "dummy card" as used herein, may comprise a baffle assembly 104*a* may be coupled to a circuit board 107 in a card slot of the circuit board 107, and may be devoid of other circuitry and/or electronics interacting with the circuit board 107. As such, the baffle assembly 104*a* may include a body or base plate 127. The baffle assembly may further include one or more tabs 129 for coupling the baffle assembly 104*a* to a circuit board 107. In an alternative embodiment, the baffle assembly 104*a* may include circuitry or electronics that may interact with the circuit board 107. As such, the base plate 127 may be a circuit board, etc., including circuitry and/or electronics configured to be coupled to the circuit board 107 and to interact with the circuit board 107. According to yet another alternative embodiment, one or more tabs 129 may couple the baffle assemble 104a to other components within the chassis 102, and/or to the chassis 102 itself.

The baffle assembly 104a may be configured having more than one zone 112a, 114a, 116a. The zones 112a, 114a, 116a may be separated by partitions 113, 115 disposed between adjacent zones 112a, 114a and 114a, 116a respectively. The partitions 113, 115 may provide separate airflow paths for each of the zones 112a, 114a, 116a. In an embodiment in which the baffle assembly 104a is configured within the form factor of a card configured to be coupled to a board 107 within the chassis 102, the height of the partitions may also be configured within the form factor of such a card. Alternatively, the height of the partitions may be configured to take advantage of the full available depth of the chassis 102.

Referring to the third zone 116a, for the convenience of description, according to one aspect, the baffle assembly 104a may be provided having more than one baffle 124a, 126, 128, 130 associated with each zone 116a. Each of the baffles 124a, 126, 128, 130 in the zone 116a may be configured to provide a different airflow resistance. For example, as shown each of the baffles 124a, 126, 128, 130 may be provided having a different free-area ratio. The various baffles 124a, 126, 128, 130 may be configured to be selectively deployable within the zone 116a of the baffle assembly 104a. A desired airflow resistance of the zone 116a may, therefore, be achieved by deploying a baffle 124a, 126, 128, 130 having a free-area ratio selected to provide the desired airflow resistance. The remaining zones 112a, 114a may have a generally analogous structure.

In the illustrated embodiment, the baffles 124a, 126, 128, 130 may be movable between a stowed configuration and a deployed configuration. In a stowed configuration the baffles 126, 128, 130 may be generally oriented to impart a minimal influence on the airflow resistance through the zone 116a. In the illustrated embodiment, in a stowed configuration the baffles 126, 128, 130 may be disposed lying generally flat against the base plate 127 of the baffle assembly 104a. In a deployed configuration, a baffle 124a may be oriented to influence the airflow resistance through the zone 116a. In the illustrated embodiment, when a baffle 124a is in a deployed configuration the baffle 124a may be oriented in a generally upright arrangement within an airflow passage defined by the zone 116a.

Consistent with the illustrated and described embodiment, the baffle assembly 104a may be customized to provide various different desired airflow resistances. In the illustrated embodiment, each of the zones 112a, 114a, 116a may be customized by selectively deploying baffles providing desired airflow resistances in each of the zones 112a, 114a, 116a. While the selection of different baffles associated with each zone is shown as being generally the same in terms of free-area ratios, this is not necessary. Any or all of the zones may include one or more baffles having free-area ratios that are different than the free-area ratios of one or more of the baffles associated with any, or all, of the other zones.

Figure 5:
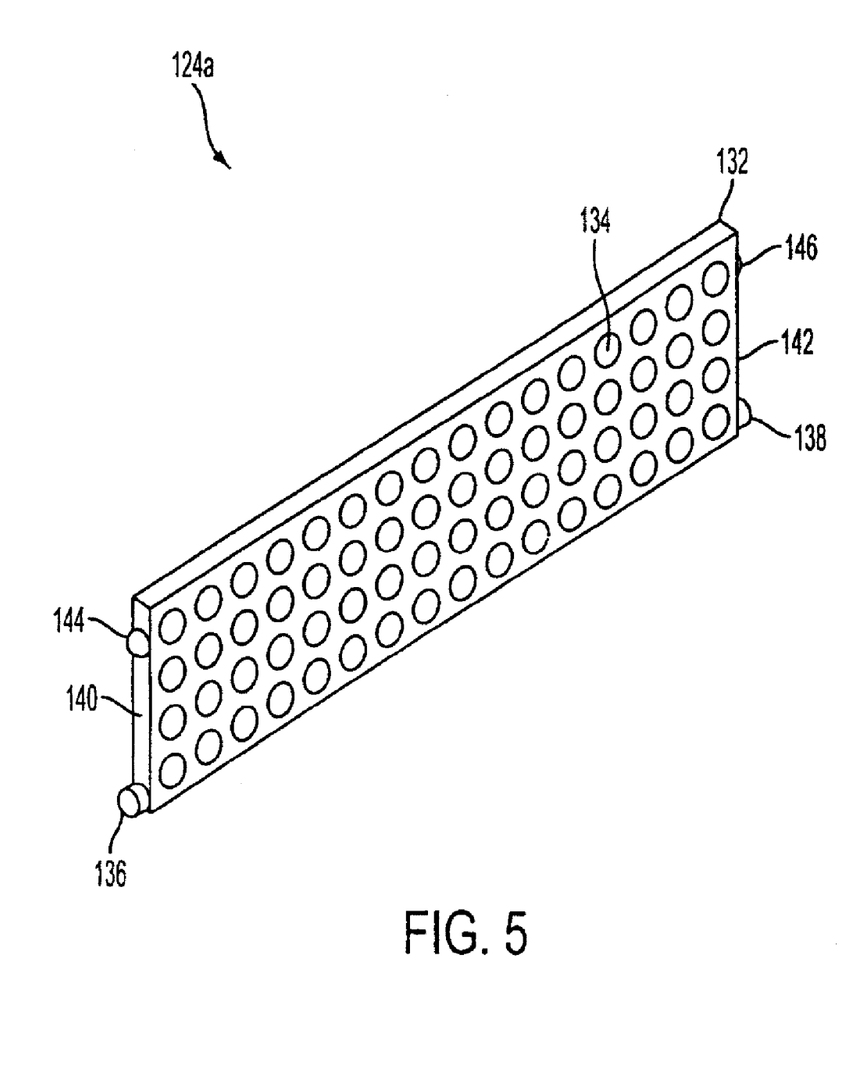
FIG. 5 is a perspective illustration of an airflow control baffle that may be used in connection with an airflow control baffle assembly consistent with the present disclosure.

With reference to the embodiment of FIG. 5, the baffle 124a may generally include a plate 132 having a plurality of holes 134 extending therethrough. The number and size of the holes 134 may be selected to achieve a desired airflow resistance. In one embodiment, the desired airflow resistance may be achieved by providing a corresponding free-area ratio of the baffle 124a. A given free-area ratio may, however, provide different airflow resistances depending upon the shape, size, and location of the individual holes 134. Accordingly, it is not necessary for there to be an absolute correlation between airflow resistance and free-area ratio. Furthermore, while the holes 134 in the baffle 124a are shown as being circular, evenly-space, and of generally equal size, none of these factors are necessary in the context of the present disclosure. Additionally, it should be understood that in order to provide the maximum airflow resistance, the baffle may be provided not having any holes or openings extending therethrough.

The baffle 124a may be configured to be pivotally movable between the stowed configuration and the deployed configuration. As shown, pivotal movement may be facilitated by providing pivots 136, 138 extending from opposed edges 140, 142 of the baffle 124a. The pivots 136-138 may be formed as bosses extending from the opposed edges 140, 142 of the baffle 124a. The pivots 136, 138 may be configured to pivotally engage cooperating features on the baffle assembly 104a, such as holes or indentations. The baffle 124a may be secured in a deployed configuration and/or in a stowed configuration using cooperating features on the baffle 124a and the baffle assembly 104a. Consistent with the illustrated embodiment, the baffle 124a may include detents 144, 146 also protruding from the opposed sides 140, 142 of the baffle 124a. The detents 144, 146 may engage cooperating indentations, e.g., 148 on the baffle assembly 104a. Other features may be used to achieve pivotal movement of the baffle 124a and/or to secure the baffle 124a in a stowed configuration and/or a deployed configuration.

The above-described baffle assembly 104a, including the baffles 120a, 122a, 124a, 126, 128, 130, partitions 113, 115, etc. may be produced using low cost manufacturing processes. For example, the baffles 120a, 122a, 124a, 126, 128, 130 and/or the body and/or other components of the baffle assembly 104a may be produced from plastic materials using conventional forming techniques such as injection molding, die cutting, etc. Alternative, and/or additional, materials and manufacturing processes and techniques may also be used for producing a baffle assembly consistent with the present disclosure. Accordingly, the baffle assembly 104a may provide a cost effective system for controlling the airflow through a chassis. The ability to control the airflow through the chassis may, as previously discussed, may improve the performance of the system and increase the freedom with which heat generating components may be located within the chassis.

According to a related embodiment, rather than providing a plurality of selectively deployable baffles having various free-area ratios, a single baffle including a selectable free-area ratio may be provided. In one such embodiment, a baffle may be provided having a plurality of removable obstructions. The removable obstructions may be selectively removed to provide a desired airflow resistance. In a particular embodiment consistent with the foregoing, a baffle may be provided having a plurality of knock-outs. The airflow resistance of the baffle may be decreased by removing a greater number of knock-outs from the baffle. The baffle may easily be formed including one, or a plurality, of regions bounded by lines of mechanical weakness allowing the regions to be removed from the baffle.

According to another embodiment, rather than including a plurality of selectively deployable baffles 124a, 126, 128, 130 providing different airflow resistances, each zone may include an arrangement for providing a variable airflow through each respective zone. Such an arrangement may include, for example, a damper for controlling the airflow relative to at least a portion of the baffle assembly. According to one embodiment, a movable member may be moved between a first position providing a first airflow resistance and a second position providing a second airflow resistance that is greater than the first airflow resistance. In one particular embodiment, the movable member may include a screen that may be moved into a position at least partially obstructing airflow through one or more zone of the baffle assembly. According to one such embodiment, a baffle having a first free-area ratio may be provided. The screen may be moved between a first position obstructing a first degree of the free-area of the baffle and a second position obstructing a second, greater, amount of the free-area of the baffle. In one such embodiment, the screen may be provided as a sliding screen that may be slidable moved between the first position and the second position.

According another embodiment, a baffle may be provided having one opening, or a plurality of openings, extending therethrough providing a first free-area ratio. The baffle may further include a movable obstruction that may be adjusted to reduce the free-area of the opening, or openings, through the baffle. For example, the movable obstruction may include one or more openings that may, in a first position, be at least partially aligned with one or more openings in the baffle, thereby providing a first free-area ratio of the baffle. The obstruction may be moved to at least a second position in which the opening in the movable obstruction at least partially blocks at least one opening in the baffle thereby providing a second free-area ratio of the baffle that is less than the first free-area ratio of the baffle. The movable obstruction may be linearly movable and/or rotationally movable between the first position and the second position. A movable obstruction herein may be moved between a first position and a second position manually and/or using an actuator, such as a solenoid, servo, or other mechanical and/or electromechanical actuator.

According to another aspect of the present disclosure, the airflow control system may include a feedback control. The temperature of at least one component and/or the temperature of at least a portion of the airflow stream within the chassis may be measured. The airflow resistance through the chassis may be controlled and/or adjusted, for example using a baffle assembly configured to provide variable airflow resistance, in response to the measured temperature. For example, in a situation in which a temperature above a threshold temperature is detected at, or adjacent to, a heat generating or a heat sensitive component, the airflow resistance of the baffle assembly may be adjusted, e.g. using an electromechanical actuator, to increase the airflow in the region of, or adjacent to, the heat generating or heat sensitive component. It should be noted, that depending upon the location of heat generating or heat sensitive component, increasing the airflow in the region of, or adjacent to, the heat generating or heat sensitive component may involve either increasing or decreasing the airflow resistance of the baffle assembly. In a related embodiment, when the temperature of, or adjacent to, a heat generating or heat sensitive component falls below a low threshold temperature, the feedback control may adjust the variable airflow resistance baffle assemble to decrease the airflow in the region of, or adjacent to, the heat generating or heat sensitive component.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus for use in an airflow control system, comprising:
    a base plate comprising a plurality of airflow zones; and
    a baffle assembly coupled to said base plate, the baffle assembly comprising:
    a plurality of baffles in each of said plurality of airflow zones, each of said plurality of baffles within each zone configured to have a different airflow resistance and configurable to provide a different airflow, the plurality of baffles configured to be selectively deployed, independent of one another, so as to achieve a desired airflow resistance.

2. The apparatus according to claim 1, wherein at least one baffle comprises at least one opening therethrough, and wherein air passes through said at least one opening at a predetermined rate when said at least one baffle is deployed.

3. The apparatus according to claim 1, wherein a first baffle of said plurality of baffles is configured to provide a first airflow resistance, and wherein a second baffle of said plurality of baffles is configured to provide a second airflow resistance.

4. The apparatus according to claim 3, wherein said first airflow resistance and said second airflow resistance are different.

5. The apparatus according to claim 1, wherein said plurality of baffles are configured to be selectively deployed between a stowed configuration and a deployed configuration, and wherein each baffle of said plurality of baffles is configured to be secured in the deployed configuration.

6. The apparatus according to claim 1, wherein each of said airflow zones has a free-area ratio of between 0% to 100%.

7. The apparatus according to claim 1, further comprising:
    a movable obstruction associated with at least one of the plurality of baffles that may be moved with respect to be associated baffle so as to adjust the associated baffle's airflow resistance.

8. The apparatus according to claim 7, wherein the movable obstruction is linearly movable with respect to the associated baffle.

9. The apparatus according to claim 7, wherein the moveable obstruction is rotatably moveable with respect to the associated baffle.

10. The apparatus according to claim 1, wherein at least one of said plurality of baffles is pivotally deployable.

11. The apparatus according to claim 1, wherein said base plate further comprises at least one partition, said partition defining at least two of said plurality of airflow control zones.

12. The apparatus according to claim 1, wherein said base plate comprises the form factor of a mezzanine card.

13. The apparatus according to claim 1, wherein said circuit board comprises an Advanced Telecommunications Computing Architecture board.

14. The apparatus according to claim 1, further comprising:
    a temperature measurement device; and
    an adjustment device configured to adjust at least one of said plurality of baffles based on, at least in part, a temperature measured by said temperature measurement device.

* * * * *